(12) United States Patent
Iwamura

(10) Patent No.: US 8,126,065 B2
(45) Date of Patent: Feb. 28, 2012

(54) AUTOMATIC POWER ADJUSTMENT IN POWERLINE HOME NETWORK

(75) Inventor: Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1730 days.

(21) Appl. No.: 11/146,340

(22) Filed: Jun. 6, 2005

(65) Prior Publication Data

US 2006/0218269 A1 Sep. 28, 2006

Related U.S. Application Data

(60) Provisional application No. 60/664,622, filed on Mar. 23, 2005.

(51) Int. Cl.
*H04K 1/10* (2006.01)
*H04L 12/28* (2006.01)

(52) U.S. Cl. .................... 375/260; 370/254

(58) Field of Classification Search .......... 375/259, 375/260; 709/224
See application file for complete search history.

(56) References Cited

U.S. PATENT DOCUMENTS

| | | | |
|---|---|---|---|
| 5,818,127 A | 10/1998 | Abraham | 307/106 |
| 5,977,650 A | 11/1999 | Rickard et al. | 307/3 |
| 6,052,380 A | 4/2000 | Bell | 370/445 |
| 6,275,144 B1 | 8/2001 | Rumbaugh | 340/310.01 |
| 6,674,997 B2 | 1/2004 | Hoctor | 455/108 |
| 6,680,979 B2 | 1/2004 | Kato | 375/260 |
| 6,697,487 B1 * | 2/2004 | Getchell | 379/417 |
| 2001/0028678 A1 | 10/2001 | Kato et al. | 375/222 |
| 2002/0009155 A1 | 1/2002 | Tzannes | 375/260 |
| 2002/0064218 A1 | 5/2002 | Willes et al. | 375/219 |
| 2002/0105964 A1 * | 8/2002 | Sommer et al. | 370/463 |
| 2002/0110138 A1 * | 8/2002 | Schramm | 370/430 |
| 2002/0130768 A1 | 9/2002 | Che et al. | 340/310.01 |
| 2003/0039317 A1 | 2/2003 | Taylor et al. | 375/295 |
| 2003/0050084 A1 * | 3/2003 | Damnjanovic et al. | 455/522 |
| 2003/0054777 A1 | 3/2003 | Hoctor | 455/108 |
| 2003/0151469 A1 | 8/2003 | Blinn et al. | 333/165 |
| 2004/0047296 A1 | 3/2004 | Tzannes et al. | 370/252 |
| 2004/0131025 A1 | 7/2004 | Dohler et al. | 370/328 |
| 2004/0151108 A1 | 8/2004 | Blasco Claret et al. | 370/206 |
| 2004/0161041 A1 | 8/2004 | Logvinov et al. | 375/257 |
| 2004/0183619 A1 | 9/2004 | Sugg | 333/24 R |
| 2004/0190460 A1 * | 9/2004 | Gaskill | 370/254 |
| 2004/0212481 A1 | 10/2004 | Abraham | 340/310.01 |
| 2004/0228273 A1 | 11/2004 | Kurobe et al. | 370/229 |
| 2005/0018784 A1 * | 1/2005 | Kurobe et al. | 375/260 |
| 2005/0030967 A1 | 2/2005 | Ohmi et al. | 370/445 |
| 2005/0037722 A1 | 2/2005 | Koga et al. | 455/205 |

* cited by examiner

*Primary Examiner* — Andrew Christensen
(74) *Attorney, Agent, or Firm* — John L. Rogitz

(57) ABSTRACT

Transmission power from a home entertainment system server to a client entertainment device in a powerline network is established such that SNR or other reception metric at the receiver is maintained between upper and lower thresholds.

20 Claims, 3 Drawing Sheets

Flow Chart

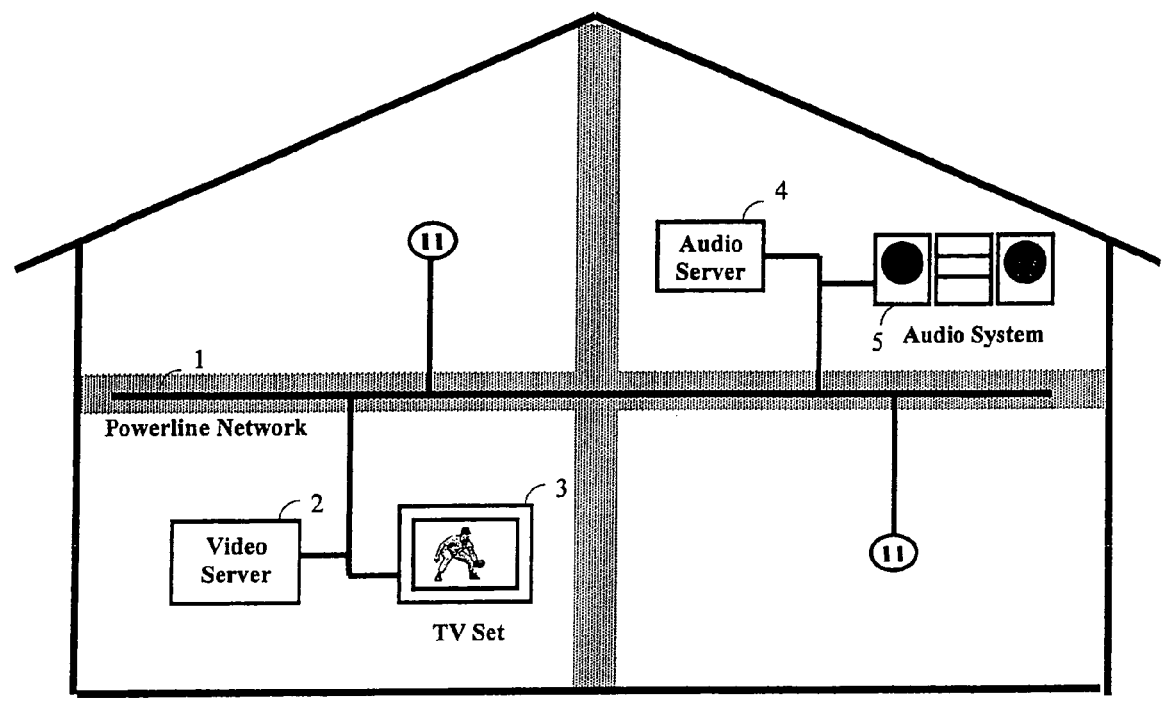
Fig.1 Powerline Home Network

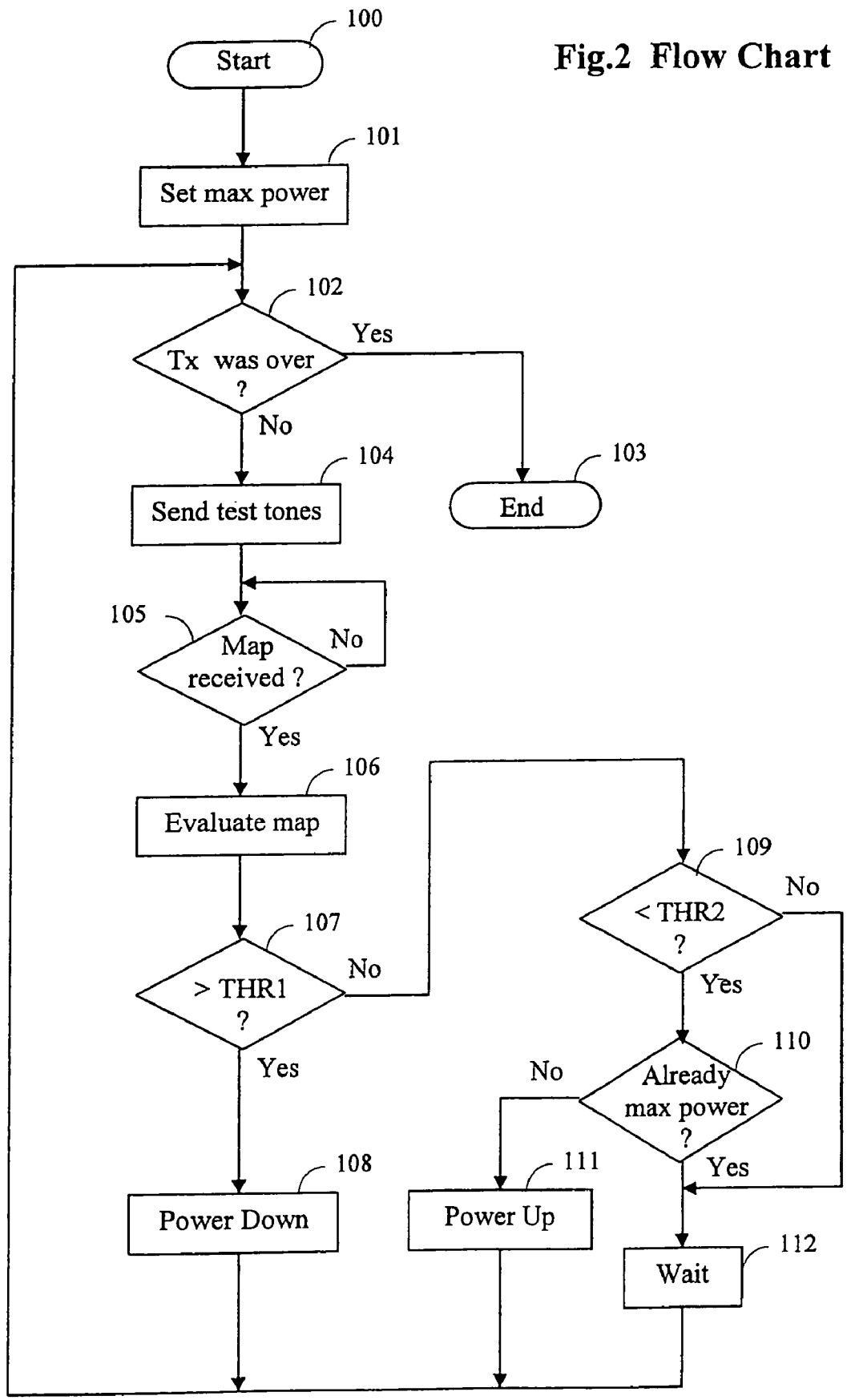
Fig.2 Flow Chart

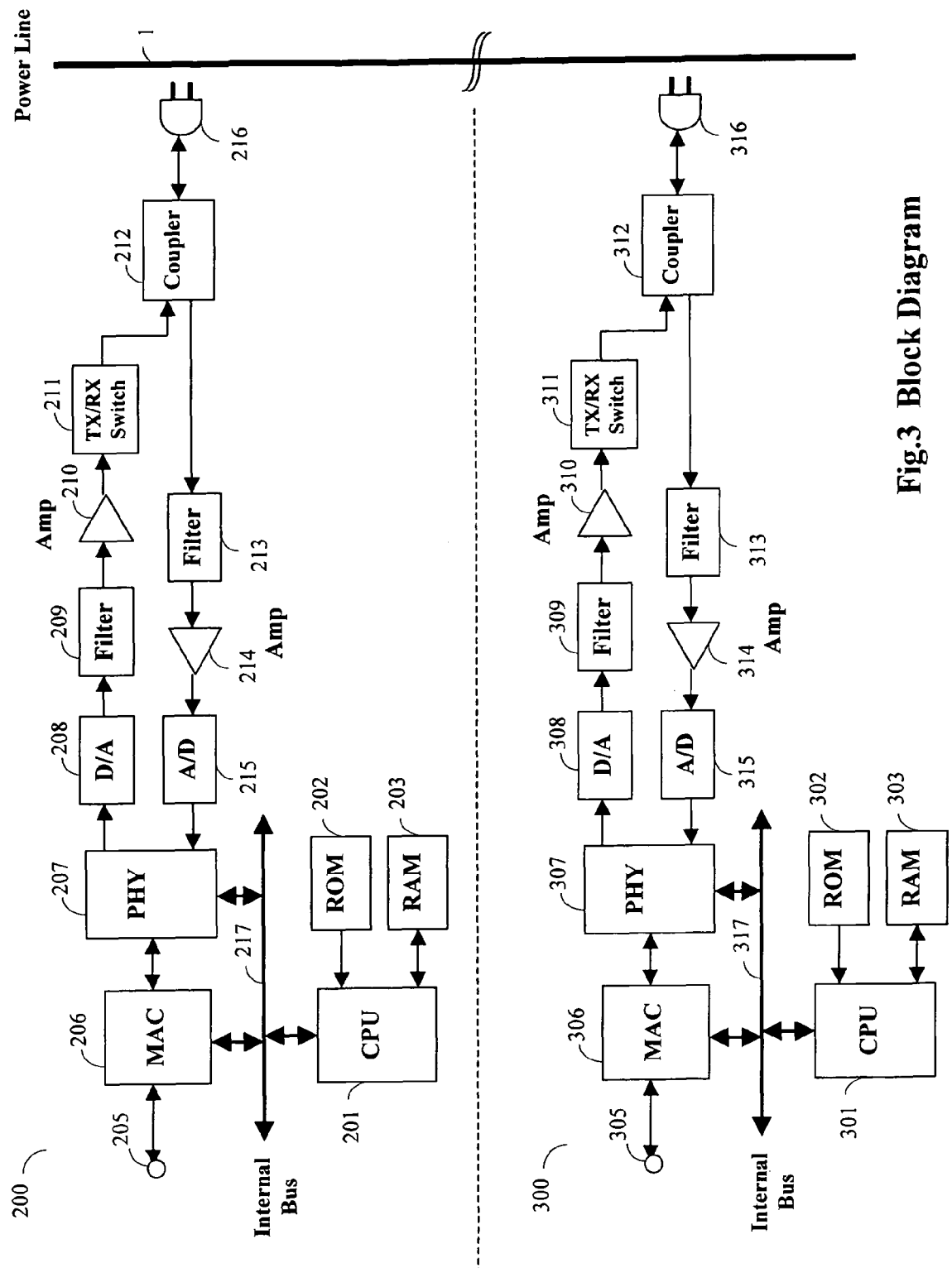
Fig.3 Block Diagram

AUTOMATIC POWER ADJUSTMENT IN POWERLINE HOME NETWORK This claims priority from U.S. provisional patent application Ser. No. 60/664,622, filed Mar. 23, 2005.

FIELD OF THE INVENTION

The present invention relates generally to home entertainment networks.

BACKGROUND OF THE INVENTION

The use of home entertainment networks is growing. In home entertainment networks, audio-video products, PCs, and other electronic appliances can be connected to, e.g., a central server to communicate each other. A powerline network, in which communication between the various components is afforded through the wires of the ac power grid of the house, frequently is regarded as a backbone of home network system.

An important issue for powerline networks is the distance a powerline network signal reaches. Specifically, it is desired that a network signal have relatively long range especially in the case of a large home. As understood herein, however, many powerline networks afford relatively short distance communication, which is not necessarily unacceptable because a network server and a TV monitor are often placed nearby each other and share the same power outlet, so that, by using a powerline network, no conventional audio/video cables are required to connect local devices together. Nevertheless, when a controlled device such as a TV monitor is placed on the opposite side of a large home from a server, relatively large transmission power at the server is required to push the audio-video signal through the power lines of the house.

As further understood herein, however, using the regulatory maximum permissible transmission power to ensure adequate reception at relatively distant network components wastes energy when the receiving device is located only a few feet away from the transmitting device. Furthermore, excessively large transmission power can cause unwanted distortion in the signal. Moreover, excessive transmission power completely occupies time or frequency access slots in the powerline network so that no other remote device can simultaneously use the slots.

Currently, a powerline network may employ OFDM (Orthogonal Frequency Division Multiplex), in which hundreds of sub-carriers between 1 and 30 MHz are modulated and transmitted to the receiver. The type of specific modulation used in the network can depend on the signal to noise ratio (SNR) of one or more sub-carriers, with the present invention critically recognizing that SNR depends on powerline layout and transmission condition and can vary when, e.g., other devices within the powerline network are energized or deenergized. When SNR is good, QAM (Quadrature Amplitude Modulation) can be used, but for lower SNR a more robust modulation, for example, QPSK (Quadrature Phase Shift Keying) modulation may be selected. However, varying modulation technique does not address the above-noted problems in attaining the optimum amplitude of transmitted power.

With the above critical recognitions in mind, the invention herein is provided.

SUMMARY OF THE INVENTION

A home entertainment system includes at least one server and at least one client device communicating with the server over a home entertainment network. Logic is executable by the server and/or client device for maintaining multimedia stream transmitted power at the minimum necessary to maintain a reception metric at the client device between upper and lower values.

The metric may be, e.g., SNR or automatic gain adjust setting. The client device may generate a tone map that represents plural individual metric elements, each element being associated with a respective sub-carrier frequency. The tone map can be sent to the server for determining an average metric to use as the reception metric. In this case, the server sends test tones to the client device and the client device generates the tone map based thereon. The metric elements can be SNRs associated with respective sub-carrier frequencies. Or, the client device can determine the reception metric and based thereon generate a command to the server to establish the transmitted power. The network can be a powerline network.

In another aspect, a method is disclosed in a powerline network of establishing transmitted signal power from a transmitter of an entertainment data stream to a receiver. The method includes initially establishing a high value for transmitted signal power, and then sending at least one tone to the receiver. From the tone, a first reception metric value is determined. If the first reception metric value does not exceed an upper threshold, transmitted signal power is left unchanged, but otherwise power is decreased. Another tone is sent and a second reception metric value is determined. If a lower threshold is less than the second reception metric, transmitted signal power is left unchanged, but otherwise power is increased.

In still another aspect, a home entertainment network includes a source of multimedia data streams, a player of streams communicating with the source via the network, and means for establishing transmitted signal power at the source for at least one multimedia stream based on at least one reception metric at the player.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a home entertainment system in which the present method for automatic transmission power adjust can be used;

FIG. 2 is a flow chart of illustrative logic; and

FIG. 3 is a block diagram of a non-limiting transmitter and receiver that may be implemented.

DETAILED DESCRIPTION OF THE PREFERRED EMBODIMENT

FIG. 1 illustrates an example of a non-limiting powerline home network 1, which can interconnect a video server 2, a television set 3 that may be considered to be a "client" of the video server 2, an audio server 4, and an audio system 5 that may be considered to be a "client" of the audio server 4. The video server 2 sends an audio/video or other multimedia stream to a TV set 3, which in the embodiment shown is placed physically close (within a few feet or yards) to the video server. In contrast, the audio server 4 sends a multimedia stream such as an audio stream to the audio system 5, which is physically located next to the audio server, with the audio 4, 5 and video 2, 3 components being tens of yards distanced from each other in the non-limiting embodiment shown.

Now referring to FIG. 2, according to the present invention a transmitter in the network 1 (e.g., the video server 2 or audio server 4) adjusts the amplitude of its transmission power level based on a reception metric such as the SNR at the associated receiver. The reception metric might be represented by, e.g., a tone map or command sent from the associated receiver (e.g., the TV 3 or audio system 5). When, for example, SNR is used as the reception metric, and when the average SNR across some or all sub-channels is good, the power lever is stepped down until the SNR goes below a first threshold. On the other hand, when average SNR is poor, power level is stepped up until the SNR rises more than the second threshold.

With greater specificity, FIG. 2 shows an example of the control flow chart of the present logic. The process starts with block 100. At block 101, transmission power level is set to the maximum. At decision diamond 102, it is determined whether data transmission, for example, streaming, is in progress. If not, the whole process terminates at block 103. If transmission is in progress on the other hand, the transmitter sends test tones to the associated receiver at block 104.

At decision diamond 105, the process waits until a tone map arrives from the receiver. It is to be understood that the tone map is generated by the receiver using the test tones sent by the transmitter, with the tone map representing the reception metrics of the test tones on the various sub-channels. When a tone map is received, the logic moves to block 106. At block 106, the tone map is evaluated. Here, in one non-limiting embodiment some or all SNRs for each sub-carrier can be averaged.

Proceeding to decision diamond 107, the averaged SNR is compared with a first threshold. If it is larger than the first threshold, the transmission power is incrementally stepped down, for example, −2 dB at block 108. Then, the logic returns to decision diamond 102. This loop is repeated until the averaged SNR is reduced to below the first threshold.

When it is determined at decision diamond 107 that the averaged SNR is not larger than the first threshold, the logic proceeds to decision diamond 109, where the averaged SNR is compared with a second threshold that is smaller than the first threshold. If the SNR is not smaller than the second threshold, the logic moves from decision diamond 109 to block 112 to wait for a certain time. This wait routine prevents too-frequent tone tests. At the elapse of the wait period, the process loops back to decision diamond 102. In contrast, if it is determined at decision diamond 109 that the averaged SNR is smaller than the second threshold, the process proceeds to decision diamond 110 to determine whether the current transmission power level is already at the maximum level, and if so the process moves to the wait routine in block 112 and then returns to decision diamond 102. If it is determined at decision diamond 110 that the power level is not at the maximum, the power level is increased incrementally, e.g., by +2 dB. Then the process returns to decision diamond 102. In this way, transmission power level is adjusted so that it stays between the first and second thresholds, i.e., a network transmitter continuously adjusts transmission power level so that the associated receiver can receive the signal in good condition, whether the receiver is close or remote, without using excessive power.

When a power consuming appliance (for example heater, oven, laundry dryer, etc.) is turned on, impedance of the power line decreases and the powerline signal gets more attenuated. Even in such a case, the present network transmitter will increase transmission power up to an optimal level. By adjusting transmission power level optimally, not only will excessive energy be saved but remote devices can share the same time or frequency access slots, since the power level of a signal sent from a transmitter to its receiver is only so large as to effect good communications between the two but not so large as to unduly interfere with other transmitter-receiver pairs.

For instance, once again referencing FIG. 1, the video server 2 sends a data stream to its associated TV set 3, while the audio server 4 sends a separate data stream to its associated audio system 5. Without the present invention, the servers 2, 4 cannot feasibly share the same time slot or frequency slot (sub-carrier), because they would be expected to maximize transmitted power and, hence, interfere with each other. However, if the video devices (2 and 3) are far from the audio devices (4 and 5), the video stream, held under the higher threshold, will be sufficiently attenuated before it arrives at the audio devices to unduly interfere with them. As a consequence, the same time or frequency slot may be shared (reused) by both servers 2, 4. In this way, transmission power adjustment improves network bandwidth In alternate embodiments, the receiver may perform the SNR evaluation, in which case the receiver sends a command to its associated transmitter to cause the transmitter to increase or decrease transmission power level in accordance with principles above. Further, instead of evaluating SNR, other reception metrics may be evaluated. For example, instead of SNRs, the gain level of the automatic gain control (AGC) of its associated receiver may be used. When an incoming signal is enough strong, the AGC gain is small. In this case, the transmitter steps down power level. When AGC gain is large, on the other hand, the large AGC setting indicates that the signal is weak, in which case the associated transmitter increases power level. Additionally, while powerline networks are the focus of the discussion above, the present principles apply to other wired or wireless networks, for example, 802.11 or Ethernet.

Non-limiting embodiments of a transmitter and receiver that may be used in the present invention are shown for illustration in FIG. 3. Component 200 may be the above-described video server 2, while component 300 may be the above-described TV set 3. It is to be understood that for clarity, blocks that are not material (ex. audio/video encoder) are not shown. Starting with the component 200, a MAC (Media Access Control) block 206 packetizes the audio/video stream from a stream data input 205 and sends the stream to a PHY (physical layer) block 207. In the PHY block 207, the data is split to each OFDM sub-carrier and modulated. The results are inverse fast Fourier transformed. The IFFTed signal is digital-to-analog converted in a digital to analog (D/A) converter 208 and band-pass-filtered in a transmit filter 209. The result is amplified in a transmission amplifier 210 and sent to a coupler 212 through a transmit/receive (TX/RX) switch 211. The signal is sent through the power plug 216 to the power line 1 to the device 300.

The gain of the transmission amplifier 210 can be controlled as described below. The TX/RX switch 211 is closed for transmission and open when the device 200 receives data from the device 300.

Incoming data is received by the coupler 212 and band-pass-filtered in a receive filter 213. The result is amplified in a receive amplifier 214, analog-digital converted in an analog to digital convert 215, and sent to the PHY block 207. The receive amplifier 214 is automatically gain controlled (AGCed) so the signal level is optimal. In the PHY block 207, the signal is fast Fourier transformed and demodulated. The data split to each sub-carrier is combined and the result sent to the MAC block 206, where it is de-packetized and sent out to the terminal 205. A CPU 201 can control each block through an internal bus 217 by, e.g., executing a software program stored in a read only memory 202. The CPU 201 can use a random access memory 203 for temporary storage.

The receiving component 300 has identical blocks to the transmitting component 200 as shown, with the last two digits of the reference numerals in the 300 series corresponding to the same last two digits of the reference numerals in the 200 series.

Relating the non-limiting transmitter 200 and receiver 300 shown in FIG. 3 to the flow chart of FIG. 2, the gain of the transmission amplifier 210 is set to an initial value. At block 108 of FIG. 2, the gain of the transmission amplifier 210 is incrementally reduced as discussed above. Also, at block 111 in FIG. 2, the gain of the transmission amplifier 210 is incrementally increased. Note that the receiver amplifier 314 in the receiver device 300 is AGCed and the gain is always adjusted to an optimal level. If the transmission power is too large, the gain of the receiver amplifier 314 is set low. As the transmission gain of the transmission amplifier 210 is reduced, the gain of the receiver amplifier 314 increases and reaches the maximum level. When the gain of the receiver amplifier 314 reaches the maximum and still a good SNR is obtained, the gain of the transmission amplifier 210 is reduced further. When SNR is poor and the transmission gain of the transmission amplifier 210 is to increase, the gain of the receiver amplifier 314 stays at the maximum level.

When the receiving device 300 sends data back to the transmitting device 200, the transmission 310 of the receiving device 300 is controlled in the same way, with the receiving amplifier 214 of the transmitting device being AGCed.

While the particular AUTOMATIC POWER ADJUSTMENT IN POWERLINE HOME NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A home entertainment system, comprising:
   at least one server;
   at least one client device communicating with the server over a home entertainment network; and
   logic executable by at least one of the server and client device for establishing multimedia stream transmitted power such that at least one reception metric at the client device is maintained between upper and lower thresholds, wherein said logic operates to automatically decrease the value of said metric at said client device whenever it is greater than said upper threshold and to automatically increase the value of said metric at said client device whenever it is less than said lower threshold.

2. The system of claim 1, wherein the metric is SNR.

3. The system of claim 1, wherein the metric is automatic gain adjust setting.

4. The system of claim 1, wherein the client device generates a tone map representative of plural individual metric elements each associated with a respective sub-carrier frequency, the tone map being sent to the server for determining an average metric to use as the reception metric.

5. The system of claim 4, wherein the server sends test tones to the client device, the client device generating the tone map based thereon, the metric elements being SNRs associated with respective sub-carrier frequencies.

6. The system of claim 1, wherein the client device determines the reception metric and based thereon generates a command to the server to establish the transmitted power.

7. The system of claim 1, wherein the network is a powerline network.

8. A method in a powerline network of establishing transmitted signal power from a transmitter of an entertainment data stream to a receiver, comprising:
   initially establishing a high value for transmitted signal power;
   sending at least one tone to the receiver;
   from the tone, determining at least a first reception metric value;
   if the first reception metric value does not exceed an upper threshold, not changing transmitted signal power but otherwise decreasing transmitted signal power, sending another tone, and determining a second reception metric value;
   if a lower threshold is less than the second reception metric value, not changing transmitted signal power, but otherwise increasing transmitted signal power.

9. The method of claim 8, further comprising, if the lower threshold is not less than the second reception metric value and after the act of increasing transmitted signal power, sending another tone, determining a third reception metric value, and determining whether the lower threshold is less than the third reception metric value.

10. The method of claim 8, comprising sending plural tones to the receiver, each being associated with a respective sub-channel frequency.

11. The method of claim 8, wherein the reception metric is at least one of SNR and automatic gain adjust setting.

12. The method of claim 8, wherein the transmitter is server in the powerline network and the receiver is a player of multimedia data streams in the network.

13. The method of claim 12, wherein the acts of determining are undertaken at the server, the player sending signals representative of the reception metric values to the server.

14. The method of claim 12, wherein the acts of determining are undertaken at the player, the player sending signals representative of commands to the server to lower and/or raise and/or maintain transmitted signal power.

15. A home entertainment network, comprising:
   a source of multimedia data streams;
   a player of streams communicating with the source via the network; and
   means for establishing transmitted signal power at the source for at least one multimedia stream based on at least one reception metric at the player to maintain the reception metric between upper and lower thresholds, wherein said means operates to automatically decrease the value of said metric at said player whenever it is greater than said upper threshold and to automatically increase the value of said metric at said player whenever it is less than said lower threshold.

16. The network of claim 15, wherein the metric is SNR or automatic gain adjust setting.

17. The network of claim 15, wherein the player generates a tone map representative of plural individual metric elements each associated with a respective sub-carrier frequency, the tone map being sent to the source for determining an average metric to use as the reception metric.

18. The network of claim 17, wherein the source sends test tones to the player, the player generating the tone map based thereon, the metric elements being SNRs associated with respective sub-carrier frequencies.

19. The network of claim 15, wherein the player determines the reception metric and based thereon generates a command to the source to establish the transmitted power.

20. The network of claim 15, wherein the network is a powerline network.

* * * * *